United States Patent [19]
Steffens

[11] 4,003,409
[45] Jan. 18, 1977

[54] ARRANGEMENT FOR OIL SPRAY PUMPS

[75] Inventor: Günter Steffens, Viersen, Germany

[73] Assignee: Cramer-Halstrup & Schrunder, Viersen-Helenabrunn, Germany

[22] Filed: Feb. 5, 1976

[21] Appl. No.: 655,375

[30] Foreign Application Priority Data

Feb. 17, 1975 Germany .................. 2506633

[52] U.S. Cl. .................. 139/1 R; 184/15 B; 139/45

[51] Int. Cl.[2] .................. D03J 1/00

[58] Field of Search ............ 139/1, 45; 184/6, 6.15, 184/6.5, 15 R, 15 BV, 27 R, 37

[56] References Cited

UNITED STATES PATENTS

| | | | |
|---|---|---|---|
| 2,087,601 | 7/1937 | Leach | 184/15 B |
| 3,221,775 | 12/1965 | Boley et al. | 139/45 |
| 3,465,848 | 9/1969 | Johansson et al. | 184/37 |
| 3,480,113 | 11/1969 | Pope et al. | 184/6.5 |

*Primary Examiner*—Henry S. Jaudon
*Attorney, Agent, or Firm*—Cushman, Darby & Cushman

[57] ABSTRACT

An oil spraying pump having a piston which is stationary with respect to a movable cylinder having a discharge opening therein. A normally sealed bore-hole extends through the piston from the cylinder interior to atmosphere. Means are provided to supply oil to the cylinder interior whereby when the bore-hole is sealed, relative movement between the cylinder and the piston causes oil to be sprayed from the discharge opening. The pump further includes a follower joined to the bore-hole seal. The follower is periodically displaced to move the seal out of sealing relationship with the bore-hole thereby venting the cylinder interior to atmosphere and preventing oil from being sprayed from the discharge opening.

3 Claims, 1 Drawing Figure

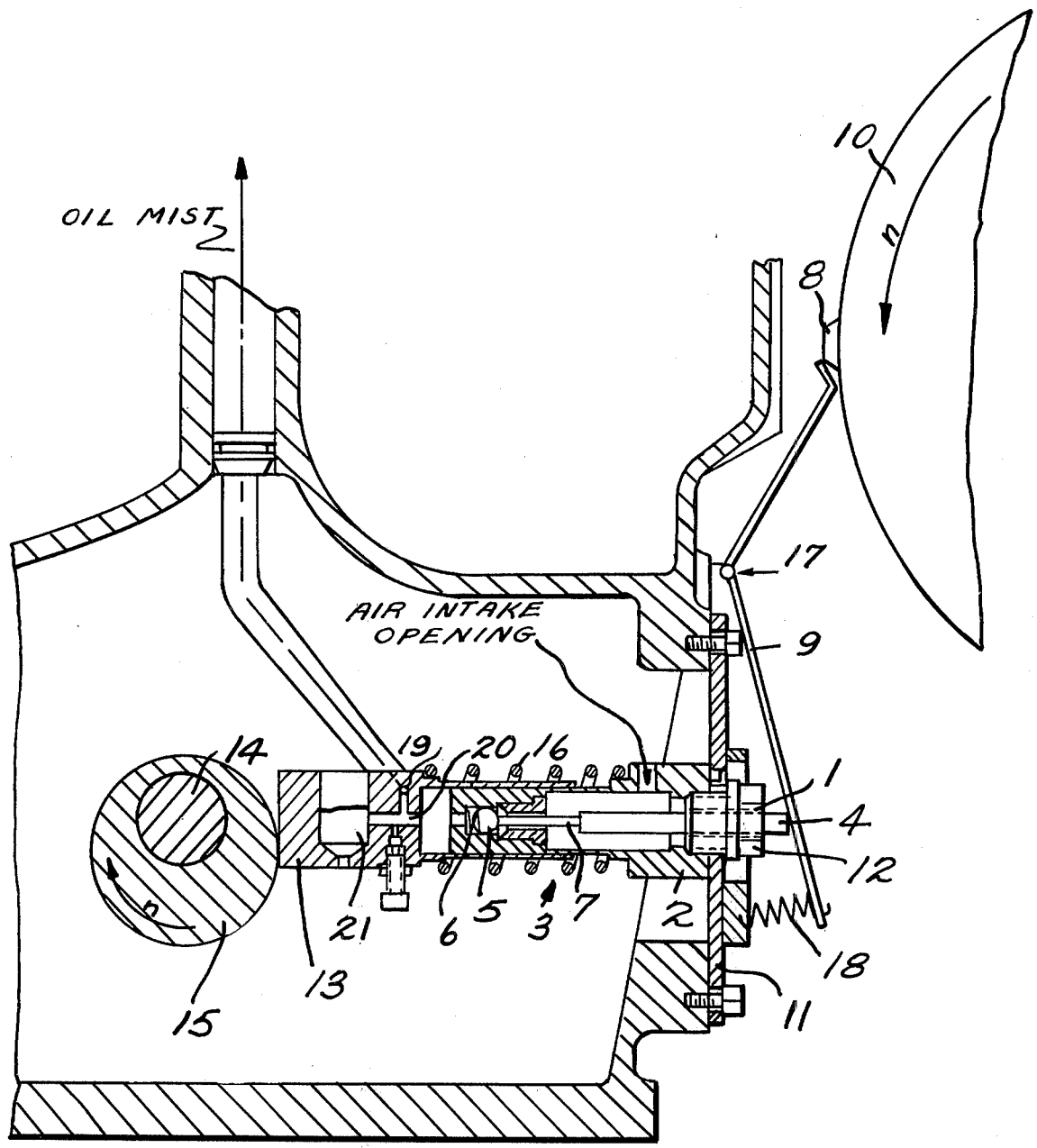

ARRANGEMENT FOR OIL SPRAY PUMPS

This invention concerns an arrangement for oil spray pumps, particularly on weaving machines, for reducing the amount of sprayed oil mist.

Oil spray pumps are placed on weaving machines in known manner and the oil is atomized. Typically, such pumps are situated in the lower part of the weaving shuttle device and lubricate the shot lock, shuttle lifter, shuttle opener, recuperator, picker and weaving shuttle. Different moving parts of the weaving loom, particularly in the region of admission of the shuttles, are lubricated continuously by the oil mist which is formed. For the practically uninterrupted operation of the oil spray pump there is provided a cam situated on the main driving shaft which releases an oil atomization action at each revolution. The pump functions in principle as a bicycle-air pump, i.e., an air cylinder is filled with air by the pulling out of the piston and/or cylinder, and the air is forced out through the return movement of the piston and/or cylinder whereby it flows over an oil bath and carries along therefrom fine oil drops.

In the operation of such known oil spray pumps it has now been proven that a substantially greater amount of oil mist is produced than is necessary for lubrication of the parts. The oil consumption therefore is unnecessarily high. Moreover, the weaving machine rooms are filled with oil mist which is unpleasant and injurious for the service personnel and which also has an adverse effect on the quality of the woven material.

There must be installed powerful suction plants in order to hold the oil mist within somewhat tolerable limits. Other attempts to reduce the amount of oil sprayed have previously had no success. A reduction in size of the atomization nozzle was not possible because of the specified viscosity of the oil. Also, a change in the drive for the operation of the oil pump has proven either not necessary or too expensive to construct and, therefore, too dear.

The purpose of the present invention is to obtain an effective reduction of the amount of oil sprayed with a suitably simple means, whereby there particularly should be provided the possibility of also being able to apply this solution to present machines.

For the solution of this problem according to the invention there is proposed the disposition of a cam follower, installed in an axial bore-hole in the stationary part of the pump, which is axially displaceable at periodic intervals by means acting on an end projecting out of the bore-hole and which presses a sealing ball against the force of a spring towards its open position.

According to a preferred form of the arrangement of the invention of the means for periodic axial movement of the cam follower, there is provided a spring-loaded lever operated by a cam or the like. Furthermore, preferably the cam or cams for operating the lever at intervals are arranged on the periphery of the control bar of the weaving machine.

Further details and advantages of the device of the invention will be described with reference to the specific example described in the drawing.

The drawing shows a section of a part of a weaving machine and an oil spray pump arranged with respect to the machine in conventional fashion as described above. The oil spray pump 3 consists of piston part 2, for example fastened to cover 11 by means of a screw 12, and cylinder part 13 axially slidable thereover. By rotation of the eccentric or cam 15 arranged on the main drive shaft 14, the movable cylinder part 13 of the oil spray pump 3 is slid over the permanently fixed piston part 2. The compression spring 16 provides in opposition that the cylinder part 13 always is urged back into the starting position.

A sealing ball 5 is arranged in the stationary piston part 2 of the oil spray pump 3, which ball is pressed by a compression spring 6 against the air intake opening to close it in the spraying process.

According to the invention, there is arranged a cam follower 7 located in an axial bore-hole 1 in the fastening screw 12. At its inner end the cam follower lies against the sealing ball 5. A lever 9 swingably mounted at 17 touches the end 4 of the cam follower 7 projecting out of the bore-hole 1 and pushes the cam follower inwardly under the action of the tension spring 18, the force of which exceeds that of the compression spring 6, in the axial direction through the bore-hole in the piston 2 and holds the sealing ball 5 away from the opening, which the ball normally closes during the spraying of oil. In this position, in the operation of the oil spray pump 3 by the cam 15 no oil is sprayed because the air located in the cylinder space cannot escape through the spray opening 19 to thereby produce oil mist, but instead escapes through the air inlet opening which is not closed by sealing ball 5 which is forced away from the opening by the cam follower 7 by the cam follower pressing inwardly under the influence of the spring-loaded lever 9.

In any suitable manner, e.g., by the cam 8 mounted on the control bar 10 of the weaving machine, the spring loaded lever 9 can be deflected against the force of the tension spring 18. During this time, the force of the tension spring 18 is practically cancelled and the cam follower 7 is forced out of the bore-hole 1 by the compression spring 6 in the piston part 2 by way of the sealing ball 5, so that the sealing ball 5 can again resume its normal sealing function and the oil spray pump 3 its intended function, namely, to atomize oil mist. This happens in such a way that the compression spring 16, fixed piston part 2 and movable cylinder part 13, so far as the position of cam 15 makes possible, separate, whereby the cylinder space fills with air via the opening closed by the sealing ball 5 during the spraying time. Through the formation of reduced pressure in the cylinder space during separation of the piston and cylinder parts 2 and 13, respectively, of the oil spray pump 3, the force of the compression spring 6 is overcome by the air flowing into the cylinder space under atmospheric pressure, which likewise presses the sealing ball 5 away from its closing position causing air to flow into the cylinder space.

From the end position in the intake phase the movable cylinder part 13 of the oil spray pump 3 is then slid back over the fixed piston part 2 by the cam 15. The sealing ball 5 is pressed against the intake opening by the excess pressure formed in the cylinder space, thereby closing the intake opening. The air located in the cylinder space of the oil spray pump then only has the possibility of escaping via the channel 20 through the opening 19 with accompanying fine oil drops from an oil sump 21. The oil mist flowing out thereby can be led at desired times in various directions, as indicated by the arrow.

As soon as the cam 8 has passed the lever 9 on the rotating control bar 10, the lever becomes free and again forces the cam follower 7, under the action of the tension spring 18, against the sealing ball 5 and brings it into an inactive position as a result of which the oil spray pump 3 stops functioning.

By suitable selection of the number of cams 8, as well as their length in peripheral direction, the number and length of spraying intervals and stopping times of the oil spray pump 3 can be regulated according to the stated requirements in any manner and can also be changed.

The particular advantage of the arrangement of the invention is the relatively simple construction and cost-favorable form through which the sought goal of reduction of sprayed oil mist is reached. Up to 90% of the earlier oil requirements can be saved by the arrangement of the invention. A further advantage of the arrangement of the invention results because of the possibility of replacing oil spray pumps of existing weaving machines, which can be carried out without great expense. The reduction of the oil consumption by introduction of the arrangement of the invention has the result that considerably smaller amounts of oil vapor are contained in the air in weaving machine rooms, which is of particular benefit to the service people and also increases the quality of the goods.

What is claimed is:

1. An oil spraying pump adapted for use with a weaving machine, comprising:
   a fixed piston provided with an axially oriented bore-hole which communicates with atmosphere;
   a movable cylinder within which said piston is located, said bore-hole opening into the interior of said cylinder;
   means for normally sealing said bore-hole;
   a follower element located within said bore-hole and having a portion projecting from an end of the piston remote from the cylinder;
   means engaging the projecting portion of said follower to periodically displace the follower thereby moving the sealing means from its sealing relationship with the bore-hole whereby the interior of the cylinder is vented to atmosphere;
   means for supplying oil to the interior of the cylinder;
   a discharge opening from the cylinder interior; and
   means for moving said cylinder axially with respect to the piston whereby when said bore-hole is sealed and said cylinder moves towards the piston, air within the cylinder interior is compressed to force oil in a mist from said discharge opening.

2. An oil-spraying pump as set forth in claim 1, wherein said means for periodically displacing the follower comprises a spring-loaded lever engaging the projecting portion of the follower and a cam contacting the lever.

3. An oil spraying pump as set forth in claim 2, wherein said cam is located on the periphery of a rotating member.

* * * * *